United States Patent [19]

Nagler

[11] Patent Number: 5,426,420
[45] Date of Patent: Jun. 20, 1995

[54] METHOD FOR ALTERNATE CIRCUITING OF DATA STREAM

[75] Inventor: Werner Nagler, Hohenschaeftlarn, Germany

[73] Assignee: Siemens Aktiengesellschaft, Munich, Germany

[21] Appl. No.: 231,873

[22] Filed: Apr. 18, 1994

Related U.S. Application Data

[63] Continuation of Ser. No. 803,615, Dec. 9, 1991, abandoned.

[30] Foreign Application Priority Data

Jan. 23, 1991 [DE] Germany .......... 41 01 929.6

[51] Int. Cl.⁶ .......... H04L 1/22; H04J 3/14; G06F 11/20
[52] U.S. Cl. .......... 340/825.01; 340/825.04; 370/16; 371/8.2; 379/273
[58] Field of Search .......... 379/10, 15, 16, 279, 379/280, 268, 269, 271, 273; 370/13, 16, 58.1, 58.2, 58.3, 59, 60.1, 62, 65.5, 68.1; 371/8.1, 8.2, 9.1, 16.3, 62; 340/825.01, 825.02, 825.03, 825.04, 825.16, 825.79

[56] References Cited

U.S. PATENT DOCUMENTS

| | | | |
|---|---|---|---|
| 4,271,403 | 6/1981 | Severson et al. | 340/825.04 |
| 4,610,013 | 9/1986 | Long et al. | 371/16.3 |
| 4,700,348 | 10/1987 | Ise et al. | 370/16 |
| 4,901,347 | 2/1990 | Schmidt et al. | |
| 4,964,095 | 10/1990 | Tyrrell et al. | 370/16 |
| 5,014,264 | 5/1991 | Nagler et al. | |
| 5,146,453 | 9/1992 | Nagler et al. | |

FOREIGN PATENT DOCUMENTS

| | | |
|---|---|---|
| 0291791 | 11/1988 | European Pat. Off. |
| 0360065 | 3/1990 | European Pat. Off. |
| 0360924 | 4/1990 | European Pat. Off. |
| 0399723 | 11/1990 | European Pat. Off. |
| 62-51349 | 3/1987 | Japan |
| 344243 | 2/1991 | Japan .......... 371/8.2 |

OTHER PUBLICATIONS

"Communications for the Information Age", by N. Skaperda, IEEE Global Telecommunications Conference & Exhibition, 28 Nov. to 1 Dec. 1988, vol. 3, pp. 1211–1220.

"Advnaces In Remote Switching Concepts", by Stachler et al, Telecommunication Switching, 7–11 May 1984, pp. 1–6.

Primary Examiner—Donald J. Yusko
Assistant Examiner—Mark H. Rinehart
Attorney, Agent, or Firm—Hill, Steadman & Simpson

[57] ABSTRACT

Method for alternate circuiting of a data stream. In the prior art, the switch status of a switchover means was controlled by what is referred to as an activation means. This has the disadvantage that a faulty control of the switchover means can occur given outage of the activation means. In order to avoid this, the switchover signal output from the activation means to the switchover means is provided such that the switchover means can automatically implement the alternate circuiting given outage of the activation means.

9 Claims, 2 Drawing Sheets

METHOD FOR ALTERNATE CIRCUITING OF DATA STREAM

This is a continuation of application Ser. No. 803,615, filed Dec. 9, 1991, now abandoned.

BACKGROUND OF THE INVENTION

The present invention is directed to a method for alternate circuiting of a data stream between a pair of processing units in a telecommunication switching center.

A prior art application of switchover equipment for two line/trunk groups LTGX and LTGY of a switching center in a switching system is depicted in FIG. 1. The two line/trunk groups LTGX and LTGY are allocated to one another for an alternate circuiting of data streams DATX or DATY. The switching center is composed of a plurality of such line/trunk groups respectively allocated to one another in pairs, of a redundant central switching network SN (the redundancy shown by SNO, SN1 in FIG. 1) and of a redundant central controller CP.

The two illustrated line/trunk groups LTGX and LTGY are each composed of a processing unit ZTX and ZTY, respectively, in which the switching and control function of the line/trunk group is realized. In addition, line/trunk groups LTGX and LTGY have interface modules DIUX and DIUY, respectively, and SDCX and SDCY, respectively that establish the connection of the respective line/trunk group to the subscribers or to other switching centers and to the central switching network and that, in particular, contain switchover equipment that can execute the alternate circuiting of the data streams.

A more detailed description of the switching center shown in FIG. 1 as well as of a method for an alternate circuiting of the data stream of a line/trunk group is disclosed in European Patent Application EP-A10 291 791 (corresponding to U.S. Pat. No. 4,901,347). According to this European patent application, the data stream, i.e. all of the processing channels with the exception of the signaling or status message channels are rerouted via an allocated processing unit in the alternate circuiting case, as well as, during routine testing or, respectively, on the basis of manual input. This must occur clock-controlled and phase-synchronized, as disclosed in greater detail in European Patent Application EP-A1 0 360 924 (corresponding to U.S. Pat. No. 5,146,953, as well as, European Patent Application EP-A1 0 360 065 regarding the control of the signaling or status message channel.

The switchover equipment in the direction of the switching network is thereby accommodated in the respective interface module SDCX, SDCY that is independent of the respective controller of the line/trunk group and is shown with a switch in FIG. 1. The control of a switchover equipment in the interface module SDCX, SDCY is effected by a switchover signal that can be output by an activation means contained in the respective processing unit.

It is known to initiate the alternate circuiting required for an outage of an activation means on the basis of the activation means contained in the allocated processing unit.

This has the disadvantage that, first, a corresponding monitoring means is additionally required in the allocated, other processing unit for monitoring an activation means contained in one processing unit, and, second, a transmission channel between the two processing units allocated to one another and necessary for the monitoring must be present. Further, there is the risk that the respective monitoring processing unit will erroneously initiate an alternate circuiting.

SUMMARY OF THE INVENTION

It is an object of the present invention to provide an improved method for alternative circuiting of a data stream.

This object is achieved by a method for alternate circuiting of a data stream between a pair of processing units of a telecommunication switching center. A data stream supplied to one processing unit of the pair for processing is supplied to further units of the telecommunication switching center or of the telecommunication switching system in a normal case via interfaces allocated thereto and after being processed. The data stream is rerouted via the other processing unit of the pair given outages in the one processing unit or for test purposes and, after a corresponding processing, is supplied to the further units as in the normal case of a data stream processed by the one processing unit. The alternate circuiting of the data stream is executed by switchover equipment in the interfaces and is controlled by an activation means in a processing means. The switch statuses of a switchover means are controlled by exactly one activation means, and for an outage of the activation means, the alternate circuiting of the data stream is independently implemented by the appertaining switchover means.

The switch statuses of the switchover means are controlled by a switchover signal controlled by the activation means. The switchover means is driven into the switch status of the normal case when the switchover signal has a pulse-shaped signal status, and the switchover means is driven into the switch status of the alternate circuiting case when the switchover signal has a static signal status. The switchover signal is generated by a pulse generating means and the pulse generating means is controlled by activation pulses of the activation means. The switchover signal is driven into the pulse-shaped signal status when the activation pulses follow one another in adequate chronological proximity. The switchover signal is driven into the static signal status when the activation pulses do not follow one another in adequate chronological proximity.

The data stream supplied to one processing unit for processing is simultaneously received and processed by the processing unit allocated to it. The alternate circuiting of the data stream occurs by switching in a switch over means for outputting the data stream to further units.

The method of the present invention particularly has the advantage of particular simplicity since a static signal status of the switchover signal is generally set by itself given an outage of the activation means.

The method of the present invention also particularly has the advantage that the alternate circuiting of the data stream can occur quickly as soon as a malfunction has been recognized, since two identical data streams are constantly supplied to a switchover equipment for output of the data stream.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

An explanation of an exemplary embodiment of the method of the present invention will now be set forth with reference to FIGS. 2 through 4.

Figure 1:
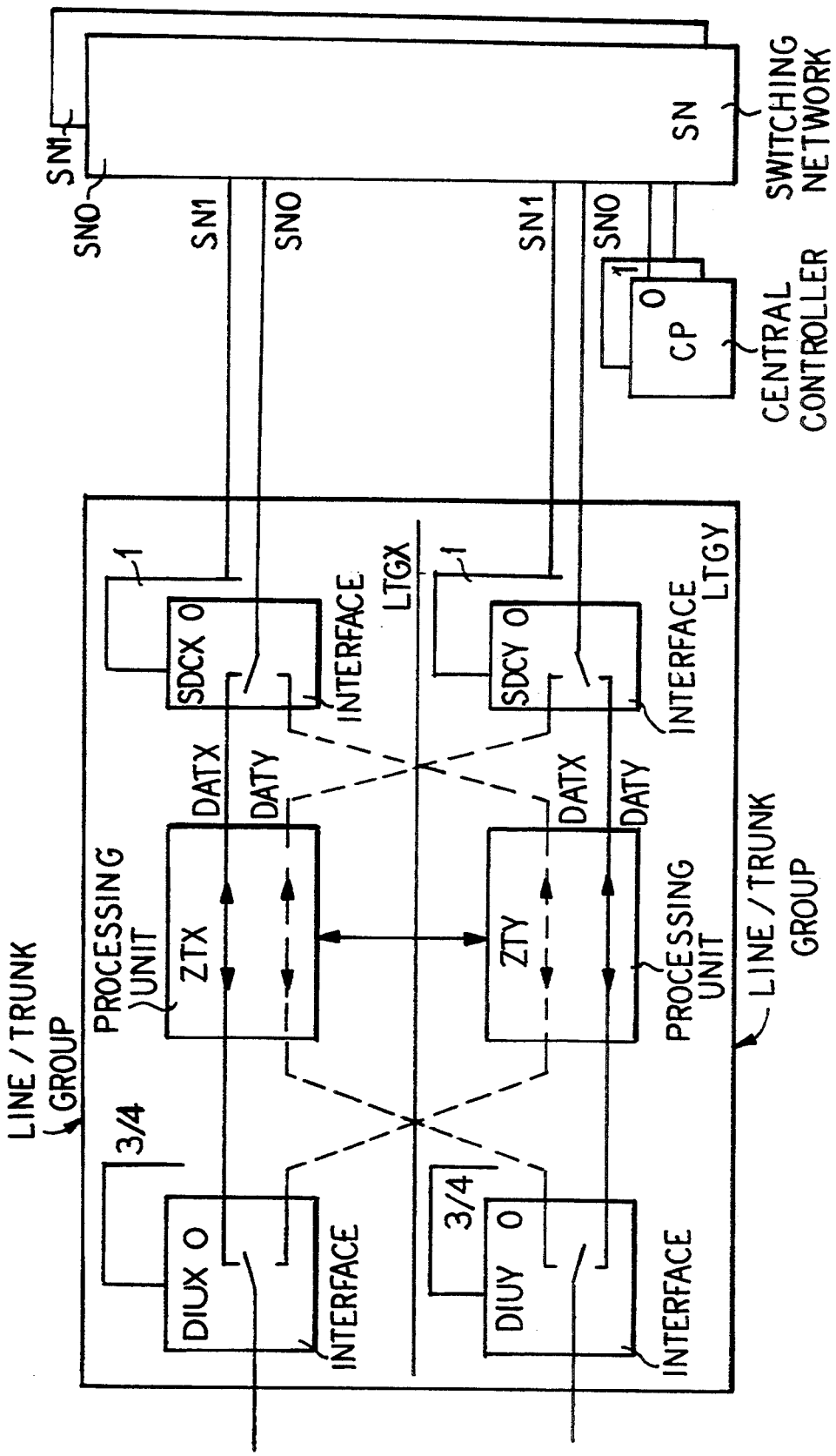
FIG. 1 is a block diagram of a specific application of switchover equipment conforming to the prior art.
Figure 2:
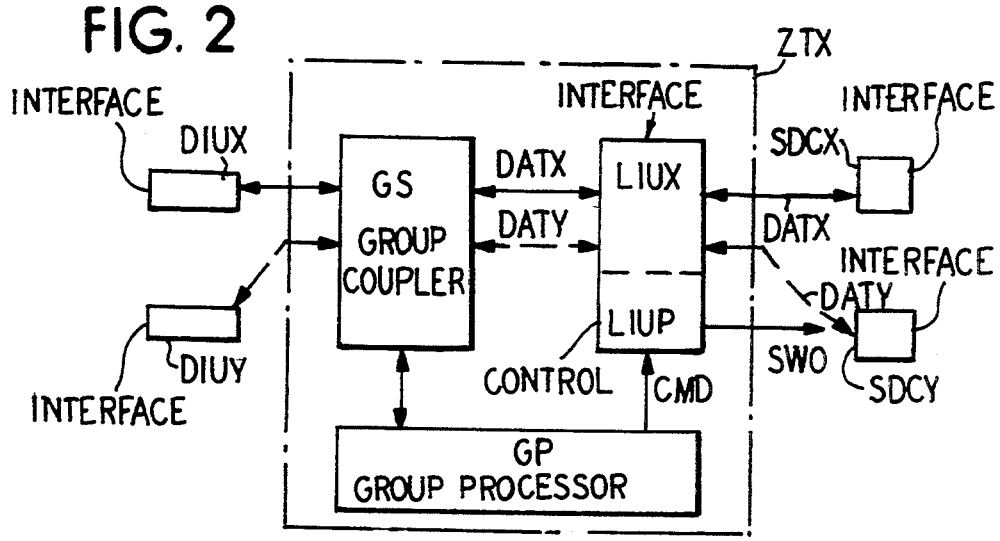
FIG. 2 is a block diagram of the generating of a switchover signal of the present invention in a processing unit of a line/trunk group according to FIG. 1.

FIG. 2 shows the generating of a switchover signal SWO of the present invention in the processing unit ZTX of the line/trunk group LTGX of FIG. 1.

The processing unit is essentially composed of a group processor GP for realizing the control function, of a group coupler GS for realizing the switching function and of an interface unit LIUX for connecting the processing unit ZTX to the interface units SDCX and SDCY that represent the interfaces between the line/trunk groups and the switching network.

The control function of the group processor GP particularly has the function of an activation means for generating an activation signal CMD dependent on specific switchover conditions. The switchover signal SWO is generated in a control means LIUP of the interface LIUX. It is activated by the activation signal CMD of the group processor GP. When, given specific malfunctions, the group processor GP can no longer actively transmit the switchover command, the control means LIUP switches the switchover signal into a static signal status. To that end, a time monitoring or approximately one second is realized in the control means LIUP, which initiates the switchover event given a failure of the activation pulses of the activation signal CMD.

In its active signal status, the switchover signal SWO is a pulse-shaped signal having 20 msec periods and having a pulse duty factor of 1:1. Its own controller is connected only in this active signal status. In the passive signal status, this switchover signal SWO is a static signal and is either at logical 1 or at logical 0 dependent on the random switching time of the corresponding switch element of the controller means LIUP.

In the static signal condition of the switchover signal, the data path DATX of FIG. 1 is always rerouted onto the paired line/trunk group LTGY. The switchover signal SWO is generated by the controller means LIUP on the basis of a software timer. The controller means LIUP can generate the passive signal status of the switchover signal or the passive signal status can be generated, by disconnecting the switchover signal.

Figure 3:
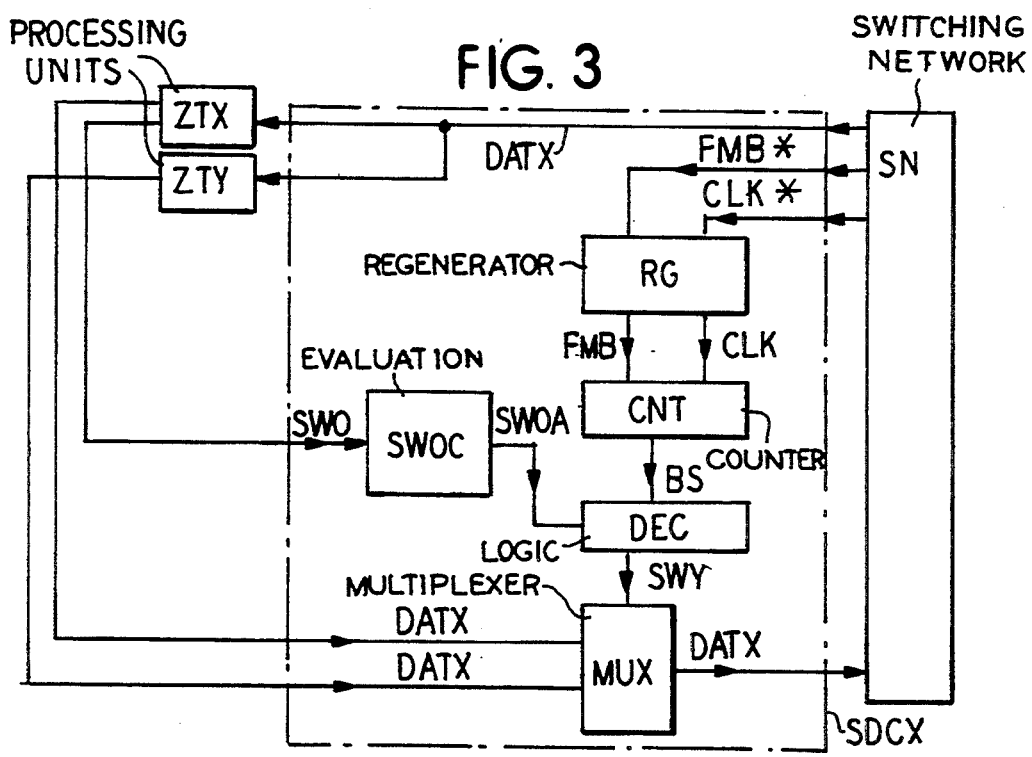
FIG. 3 is a block diagram of an interface unit for a line/trunk group in the direction of the central switching network for switchover of a data stream and for regeneration of the system clocks.

FIG. 3 shows the interface SDCX for rerouting the data stream DATX and for regeneration of the clocks CLK and FMB from the switching network SN that shall be referred to below as switchover means SDCX for the sake of simplicity. Regenerator RG regenerates clock signals FMB and CLK from clock signals FMB* and CLK* that are supplied by the switching network SN. The power supply of the switchover means is independent of the power supply of the central unit ZTX, so that the switchover event can occur even given outage of the power supply of the central unit.

The switchover signal is monitored in the switchover equipment SDCX with a special evaluation circuit SWOC. Stated more precisely, the outage of the pulse signal or, respectively, the appearance of a static signal status, i.e. of a logical 0 or of a logical 1, is monitored. Brief disturbing pulses are eliminated. When the pulse-shaped switchover signal fails to arrive, the output of the evaluation circuit switches after approximately 60 msec from logical 0 to logical 1 and thereby initiates the switchover event.

As a result of the specific nature of the drive of the switchover equipment with the switchover signal SWO, the switchover equipment SDCX can independently initiate and implement the switchover event in case of an outage of the central unit ZTX.

The output signal of the evaluation circuit SWOC does not directly effect the switchover event since this signal can appear at an operating point in time, i.e. can also occur asynchronously vis-a-vis the system clock. So that the actual switchover can be executed exactly at a data byte boundary, a byte signal BS is additionally required that changes its signal status in a defined direction exactly at a data byte boundary and thus generates a defined signal edge. This byte signal BS is derived from the system clock CLK and from the frame clock FMB in FIG. 3 using a counter CNT. The frame clock signal FMB thereby sees to it that the counter CNT is set to a specific counter reading at every frame beginning and thereby remains synchronized to the frame.

A logic element DEC generates the actual switchover control signal SWY dependent on the asynchronous switchover signal SWOA and on the byte signal BS. Finally, the status of the actual switchover control signal SWY controls the switch status of a multiplexer MUX and, thus, the through-connection of the data stream DATX from the central unit ZTX or ZTY in the direction of the switching network SN.

Figure 4:
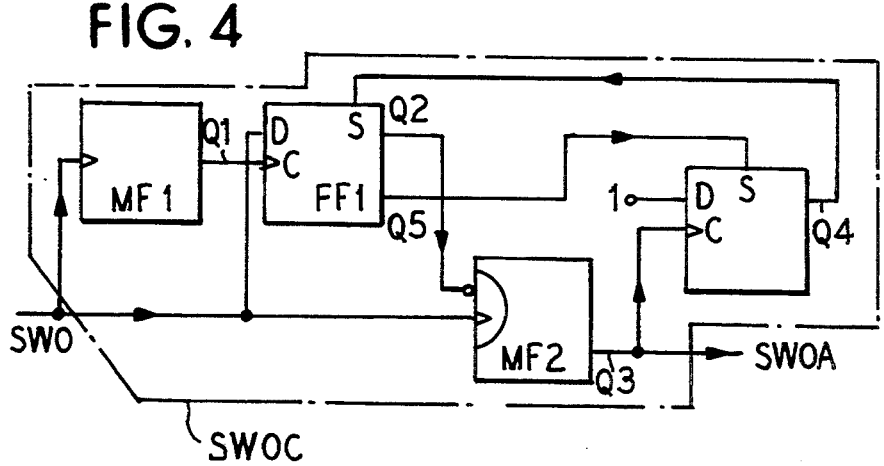
FIG. 4 is a block diagram of an evaluation circuit of the switchover means for monitoring the switchover signal.

FIG. 4 shows the evaluation circuit SWOC for monitoring the switchover signal SWO. The evaluation circuit is composed of first and second one shot multivibrators MF1 and MF2 and is also composed of first and second flip-flops FF1 and FF2. The triggering of the one shot multivibrators and of the flip-flops respectively occurs with a leading edge of the respective clock input signal. The flip-flops are D-flip-flops without through-connect delay.

As already mentioned, the switchover signal SWO is a periodic signal having a 10 msec pulse duration and a pulse separation of the same length in its active signal status. The first one shot multivibrator MF1 and the first flip-flop FF1 together monitor the switchover signal for the defined pulse shape. The first one shot multivibrator has the cut-out time element of approximately 15 msec. The one shot multivibrator MF2 has the cut-out time element of approximately 60 msec and serves the purpose of monitoring the pulse periods of the switchover signal, i.e. of switching the asynchronous switchover signal SWOA from logical 0 to logical 1 given the failure of a leading edge of the switchover signal over a time span of more than 60 msec. In common, the first and second flip-flops provide, first, for a resetting of the evaluation circuit when the switchover signal assumes an undefined pulse-shape or static signal status and, second, provides for a suppression of noise pulses in the reset condition, as a result whereof a resetting of the data stream via the asynchronous switchover signal SWOA is prevented.

In the normal case, the first one shot multivibrator MF1 is triggered by the leading edge of the active switchover signal SWO and switches the inverse output Q1 to logical 0. After the expiration of the cut-out time element of the first one shot multivibrator of 15 msec, the first flip-flop FF1 is clocked with the leading signal edge of the inverse output Q1. The first flip-flop assumes the status of the switchover signal via the input D to the output Q2. The signal of the output Q2 controls the input of the second one shot multivibrator MF2. In the normal case, i.e. a defined pulse duration of the switchover signal, the second one shot multivibrator MF2 is enabled, whereas the second one shot multivibrator MF2 is inhibited in case of an error (for example, a pulse duration longer than 15 msec, a pulse separation shorter than 5 msec) or in the test case (static switchover signal).

As a result of this control of the second one shot multivibrator, the alternate circuiting condition can be triggered via the asynchronous switchover signal SWOA when a passive switchover signal SWO, i.e. an undefined pulse shape of the switchover signal or a static switchover signal SWO, is present.

Over its cut-out time element of 60 msec, the second one shot multivibrator MF2 monitors the switchover signal SWO as to its periodic cycle. Given a correct pulse cycle, the second one shot multivibrator is constantly retriggered and supplies a logical 0 at the inverse output Q3. When the second one shot multivibrator is not retriggered, it changes back into its quiescent position (inverse output Q3 at logical 1) and thus synchronously initiates a switching of the data stream DATX via the asynchronous switchover signal SWOA.

The change of the second one shot multivibrator MF2 into its quiescent state also supplies a leading signal edge of the clock input C of the second flip-flop FF2 and thus effects a setting of the first flip-flop FF1 via the output Q4 and, thus, an inhibiting of the input at the second one shot multivibrator MF2. Simultaneously, the second flip-flop FF2 is again reset via the inverse output Q5 of the first flip-flop FF1.

The evaluation circuit SWOC thus assumes the quiescent condition when no pulses having a defined length or when no continuous signals arrive at the clock input of the second one shot multivibrator. In this condition that is also assumed after the voltage is switched on, the second one shot multivibrator supplies the asynchronous switchover signal SWOA with the level logical 1 at the inverse output Q3 and thereby initiates a switching of the data stream DATX. In this quiescent condition, moreover, the input of the second one shot multivibrator MF2 is inhibited via the first flip-flop FF1. As a result thereof, the first incoming pulse of the switchover signal is accepted only into the first one shot multivibrator and into the first flip-flop, by contrast whereto the second one shot multivibrator is only activated by the second pulse of the switchover signal. Noise pulse are blanked out on the basis of this circuit measure and an erroneous reswitching of the at a stream DATX is prevented.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for alternate circuiting of a data stream between two processing units in a telecommunication switching center, comprising the steps of:
   supplying a data stream in a normal case to one processing unit of the two processing units for processing wherein after being processed the data stream is supplied to further units of said telecommunication switching center via interfaces allocated to the one processing unit;
   rerouting the data stream via the other processing unit of the two processing units in case of an outage of the one processing unit or for test purposes, wherein after a corresponding processing of the data stream, the data stream is supplied to the further units as in the normal case when the data stream is processed by the one processing unit;
   executing the alternate circuiting of the data stream by switchover means in the interfaces and controlling the alternate circuiting by an activation means in a processing unit;
   controlling switch statuses of a switchover means by only one activation means; and
   given outage of the activation means wherein said outage is a disruption in a chronological series of pulses output by said activation means to a respective interface, independently implementing the alternate circuiting of the data stream in the appertaining switchover means.

2. The method according to claim 1, wherein the switch statuses of the switchover means are controlled by a switchover signal controlled by the activation means, and wherein the method further comprises the steps of:
   driving the switchover means into a switch status of the normal case when the switchover signal has a pulse signal status; and
   driving the switchover means into a switch status of an alternate circuiting case when the switchover signal has a substantially constant level signal status.

3. The method according to claim 2, wherein the method further has the steps of:
   generating the switchover signal by a pulse generating means and controlling the pulse generating means by activation pulses output by the activation means;
   driving the switchover signal into the pulse signal status when the activation pulses follow one another with at least a predetermined density during a predetermined time period;
   driving the switchover signal into the substantially constant level signal status when the activation pulses do not follow one another with at least the predetermined density during the predetermined time period.

4. The method according to claim 1, wherein the method further comprises the steps of:

receiving and processing by the other processing unit the data stream simultaneously with the processing of the data stream by the one processing unit; and effecting the alternate circuiting of the data stream by switching in the switchover means to thereby supply the data stream to the further units.

5. A method for alternate circuiting of a data stream between two processing units connected to a telecommunication switching network comprising the steps of:

providing first and second line/trunk groups each having a processor unit connected to a first interface and by a second interface to the telecommunication switching network;

supplying a data stream for processing to the first interface for one processing unit of the two processing units wherein after being processed the data stream is supplied to the telecommunication switching network by means of the second interface for the one processing unit;

rerouting the data stream via the other processing unit of the two processing units for at least an outage of the one processing unit, wherein, after a corresponding processing of the data stream in the other processing unit, the data stream is supplied to the telecommunication switching network by means of the second interface for the one processing unit;

executing the alternate circuiting of the data stream by switchover means in the first and second interfaces for the respective processing unit and controlling switch statuses of the switchover means for the alternate circuiting by one activation means in the respective processing unit;

controlling the switch statuses of the switchover means by a switchover signal controlled by the activation means;

driving the switchover means into a switch status of a non-alternate circuiting case when the switchover signal has a pulse signal status;

driving the switchover means into a switch status of an alternate circuiting case when the switchover signal has a substantially constant level signal status; and given outage of the activation means wherein said outage is a disruption in a chronological series of pulses output by said activation means to a respective interface, independently implementing the alternate circuiting of the data stream by the appertaining switchover means.

6. The method according to claim 5, wherein the method further has the steps of:

generating the switchover signal by a pulse generating means and controlling the pulse generating means by activation pulses output by the activation means; driving the switchover into the signal pulse signal status when the activation pulses follow one another with at least a predetermined density during a predetermined time period; driving the switchover signal into the substantially constant level signal status when the activation pulses do not follow one another with at least the predetermined density during the predetermined time period.

7. The method according to claim 5, wherein the method further comprises the steps of:

receiving and processing by the other processing unit the data stream simultaneously with the processing of the data stream by the one processing unit; and effecting the alternate circuiting of the data stream by switching in the switchover means.

8. A method for alternate circuiting of a data stream between two processing units connected to a telecommunication switching network comprising the steps of:

providing first and second line/trunk groups each having a processor unit connected to a first interface and by a second interface to the telecommunication switching network;

supplying a data stream for processing to the first interface for one processing unit of the two processing units, wherein after being processed the data stream is supplied to the telecommunication switching network by means of the second interface for the one processing unit;

rerouting the data stream via the other processing unit of the two processing units for at least an outage of the one processing unit, wherein, after a corresponding processing of the data stream in the other processing unit, the data stream is supplied to the telecommunication switching network by means of the second interface for the one processing unit;

executing the alternate circuiting of the data stream by switchover means in the first and second interfaces for the respective processing unit and controlling switch statuses of the switchover means for the alternate circuiting by one activation means in the respective processing unit;

controlling the switch statuses of the switchover means by a switchover signal controlled by the activation means;

driving the switchover means into a switch status of a non-alternate circuiting case when the switchover signal has a pulse signal status;

driving the switchover means into a switch status of an alternate circuiting case when the switchover signal has a substantially constant level signal status;

generating the switchover signal by a pulse generating means and controlling the pulse generating means by activation pulses output by the activation means;

driving the switchover signal into the pulse signal status when the activation pulses follow one another with at least a predetermined density during a predetermined time period; driving the switchover signal into the substantially constant level signal status when the activation pulses do not follow one another with at least the predetermined density during the predetermined time period; and given outage of the activation means wherein said outage is a disruption in a chronological series of said activation pulses, independently implementing the alternate circuiting of the data stream by the appertaining switchover means.

9. The method according to claim 8, wherein the method further comprises the steps of:

receiving and processing by the other processing unit the data stream simultaneously with the processing of the data stream by the one processing unit; and effecting the alternate circuiting of the data stream by switching in the switchover means.

* * * * *